United States Patent [19]
Shutt

[11] Patent Number: 6,025,027
[45] Date of Patent: Feb. 15, 2000

[54] METHOD FOR PRODUCING CELLULOSE INSULATION MATERIALS USING LIQUID BORATE FIRE RETARDANT COMPOSITIONS

[75] Inventor: Thomas Clifford Shutt, Denver, Colo.

[73] Assignee: Mountain Develpoment, Auburn, Calif.

[21] Appl. No.: 09/300,038

[22] Filed: Apr. 26, 1999

[51] Int. Cl.⁷ .................................................. B05D 1/02
[52] U.S. Cl. ...................... 427/337; 427/395; 427/427; 106/18.13
[58] Field of Search .................................. 427/421, 427, 427/337, 394, 395; 106/18.13

[56] References Cited

U.S. PATENT DOCUMENTS

| | | | |
|---|---|---|---|
| 4,173,666 | 11/1979 | Quinto | 427/427 |
| 4,285,842 | 8/1981 | Herr | 252/607 |
| 5,290,843 | 3/1994 | McDonald et al. | 524/405 |
| 5,534,301 | 7/1996 | Shutt . | |

*Primary Examiner*—Diana Dudash
*Assistant Examiner*—Jennifer Calcagni
*Attorney, Agent, or Firm*—Gene Scott-Patent Law & Venture Group

[57] ABSTRACT

A method for producing an improved fire retarding compound for use with cellulose insulation materials uses the same concept as boric acid and borax, but substitutes liquid borates rather than powdered borates. Such liquid borates enables the amount of chemical to be reduced by approximately fifty percent. This offsets the high cost of the use of borates. Additionally, the inexpensive borate, borax, is the only boron containing chemical used in the present invention method and it is converted to boric acid once impregnated inside the cellulose insulation material.

8 Claims, No Drawings

METHOD FOR PRODUCING CELLULOSE INSULATION MATERIALS USING LIQUID BORATE FIRE RETARDANT COMPOSITIONS

BACKGROUND OF THE INVENTION

1. Field of the Invention

This invention relates generally to the production of a fire-resistant cellulose insulation product, and more particularly to fire-resistant cellulose insulation materials using alkali borates as liquid flame retardants.

2. Description of Related Art

Previously, the cellulose industry used powdered boric acid (H3BO3) and powdered borax (Na2B4O7.5H2O) sodium tetraborate pentahydrate, almost exclusively as flame retardants in the manufacture of cellulose insulation. These two chemicals, mixed in the ratio range of from 1:2 to 1:4 (boric acid:borax) is still generally accepted as the best flame retardant formula although today, because of its expense, it is not commercially used. Instead, ammonium sulfate is used as a substitute for borax in a ratio range of from 1:2 to 1:6 (boric acid:ammonium sulfate). The use of ammonium sulfate has introduced problems however, such as corrosion and unacceptable odor and therefore, research is ongoing in the industry to find an inexpensive substitute for the sulfate.

All cellulose insulation must pass a series of tests described in ASTM C-739, before the U.S. Government will permit its sale. The most important of these tests are: a corrosion test; a critical radiant flux test which measures the ability of the product to prevent the spread of fire by surface burning; and a smolder test which measures the ability of the product to extinguish burning beneath the surface. The boric acid and borax mixture described above, is able to easily pass all three of these tests. Boric acid alone is able to pass the critical radiant flux, and smolder tests, but being acidic it fails the corrosion test and, when used alone it is an expensive approach. Borax alone is able to pass the critical radiant flux and corrosion tests and is cheaper than boric acid, but it does not pass the smolder test because its alkalinity, due to the sodium, actually enhances smoldering.

When combined in the preferred ratio range as defined above, the two chemicals neutralize each other so as to easily pass the corrosion test. The boric acid overwhelms the effect of the sodium ensuring that the combination passes the smolder test as well.

U.S. Pat. No. 5,534,301 to Shutt, issued on Jul. 9, 1996 is hereby incorporated into the present application by reference. This prior art patent provides an up-to-date description of the field of the present invention so as to enable an understanding of the improvements provided by the present invention method. Further, this patent teaches a method for producing a fire-retardant composition including any one or more of ammonium sulfate, monoammonium phosphate, diammonium phosphate, boric acid, aluminum sulfate, sodium tetraborate, ferrous sulfate and zinc sulfate, which as will be described below is relevant to the present invention.

The prior art does not teach the use of alkali borates as liquid flame retardants in cellulose insulation. This has not been accomplished, most likely, because the solubility of boric acid and sodium tetraborate in water, is known to be quite low thereby producing a product with excessive water content.

SUMMARY OF THE INVENTION

The present invention teaches certain benefits in construction and use which give rise to the objectives described below.

The present invention provides a method for producing an improved fire retarding compound for use with cellulose insulation materials. The present inventive compound uses the same concept as the above described boric acid and borax, but substitutes liquid borates rather than powdered borates. Such liquid borates enable the amount of chemical to be reduced by approximately fifty percent, i.e., 9% liquid instead of 18% powder, for instance. This offsets the high cost of the use of borates. Additionally, the inexpensive borate, borax, is the only boron containing chemical used in the present invention method and it is converted to boric acid once impregnated into the cellulose insulation material. Because the present method impregnates the chemicals into the paper it is more effective than commercial powder applications. Because liquids are used only about one-half of the retardant is necessary as compared to dry processing. The method allows a manufacturer to effectively remove all dust from the product.

A primary objective of the present invention is to provide a method having advantages not taught by the prior art.

Another objective is to provide such a method capable of producing a low cost fire retarding compound for use with cellulose insulation materials.

A further objective is to provide such a method capable of producing such a low cost fire retarding compound for use with cellulose insulation materials that passes all of the tests prescribed in ASTM C-739 including corrosion, critical radiant flux and smolder.

Other features and advantages of the present invention will become apparent from the following more detailed description, taken in conjunction with the accompanying drawings, which illustrate, by way of example, the principles of the invention.

DETAILED DESCRIPTION OF THE INVENTION

It is well known that both boric acid and borax have limited solubility in water. At 68° F., their solubilities are, respectively, 4.5% and 5.5%. At such a concentration their use as flame retardants in the cellulose industry is impractical. For instance, manufacturing equipment would be adversely affected and drying costs of production would be prohibitively high.

In the present invention a process is defined starting with borax as a raw material. It is then converted to metaborate by mixing it with an alkali hydroxide by the process:

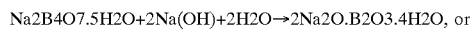

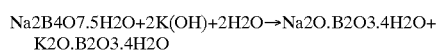

Similarly, by adding a mixed alkali hydroxide the same end products would be produced albeit in varying proportions. The ideal solution concentration is 35% although a range of solution concentration from 20% to 45% may be acceptable. The use of sodium hydroxide or potassium hydroxide or a mixture is selected in accordance with operating temperature and the price of these raw materials. Potassium metaborate has much greater solubility in water than does sodium metaborate, however, potassium hydroxide is more than twice as expensive as sodium hydroxide. The alkali metaborate is prepared as an aqueous solution that is sprayed into newsprint. As an example, using a 35% concentration, one-hundred pounds of newsprint absorbs 9.9 pounds of metaborate and 18.4 pounds of water which is later driven off, yielding a dry product. It has been discovered that approximately 9% of the chemical in the newsprint is adequate for meeting ASTM requirements as the previously described (except the smolder test) and more than 9% would only tend to drive the cost of production upward.

A second liquid is added in order to convert the metaborate into boric acid plus a salt, and such is necessary to meet all of the ASTM requirements. The second liquid contains an acid radical which may be a true acid or an acid derivative capable of reacting with the alkali. Any acid will react with metaborate producing boric acid and a salt of the original acid, for example, citric acid and metaborate producing boric acid and sodium citrate. Hydrochloric acid would produce boric acid and sodium chloride; formic acid would produce boric acid and sodium formate., etc. In selecting an acid one must consider toxicity, volatility, end product and cost. For example formic acid because of its high volatility is too toxic to use in this industry; hydrochloric acid produces sodium chloride (common salt) which is corrosive in ASTM c-739; citric acid is too expensive for this industry. By far the cheapest acid to use in this application is sulfuric acid. However, although it performs well and is cheap it is dangerous to handle. Ferrous sulfate (which is acidic) is a reasonably safe material to handle and it is also cheap. Hence, it is the desired compound even though it is not as effective as pure acid.

An example of the use of an acid is:

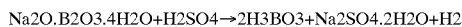

Na2O.B2O3.4H2O+H2SO4→2H3BO3+Na2SO4.2H2O+H2

An example of an acid derivative is:

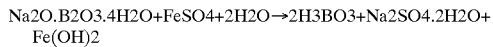

Na2O.B2O3.4H2O+FeSO4+2H2O→2H3BO3+Na2SO4.2H2O+Fe(OH)2

These reactions neutralize the metaborate bringing the pH into the range 6.5 to 8.0 and yielding boric acid to offset the effect of alkali in the smolder test. ASTM C-739 requires that cellulose insulation pass a corrosion test. In that test the flame-retardant in cellulose is caused to react with thin sheets of copper, aluminum and iron. If the pH of the insulation falls outside the range 6.5 to 8.0, one almost certainly gets corrosion of at least one of the metals. So, although pH alone doesn't lead to corrosion, it is almost inevitable that a pH outside of the range quoted indicates the presence of substances that will be corrosive.

It has been explained that high water solubility is the reason that metaborate is used. However, combinations of boric acid and borax, although more costly and less soluble can also be used in this process. Metaborate solution concentrations in excess of 60% can be used in the manufacture of cellulose insulation. However, the optimum concentration range is 25% to 45% because of viscosity, drying cost and liquid penetration rate considerations. As discussed, the optimum concentration has been discovered to be 35%.

Further, surfactants may also be inventively added into the metaborate solutions to assist in penetration rate. A typical surfactant is Rohm and Hass 9N9 which is added in the amount of 0.1% to the solution.

The solution may be sprayed into the paper at any step in the insulation manufacturing process in order to meet the requirements of ASTM C-739. However, an ideal location for spraying is directly after the grinding process so as to assure that the cutting edges of the equipment are not damaged or degraded by the chemicals. The ground but untreated cellulose is preferably introduced into the spray step in a continuous process with the metaborate solution first and then with the acid solution. The sprayed materials are then dried and bagged. The particle size of the sprayed liquid is preferably 40 to 100 microns. This is achieved by using spray nozzle pressures in the range of between 60 and 120 psi. The ideal droplet size is 40 to 100 microns. This range has been determined through experimentation in a manufacturing facility. It has been found that a particle size above 100 microns leads to poor coverage of the insulation thereby requiring more chemical. A particle size less than 40 micron also requires more chemical. This is because cellulose is transported by a high velocity air stream and in such an air stream a very small particle evaporates so quickly that some of the chemical in the droplet precipitates and turns to powder. Powder is only half as efficient as liquid hence the need for more chemical when using a particle size finer than 40 micron.

While the invention has been described with reference to at least one preferred embodiment, it is to be clearly understood by those skilled in the art that the invention is not limited thereto. Rather, the scope of the invention is to be interpreted only in conjunction with the appended claims.

What is claimed is:

1. A method for producing fire retarding cellulose insulating material, the method comprising the sequential steps of:
   a) preparing a cellulose insulation material adapted for receiving a fire retardant;
   b) reacting borax with an alkali hydroxide to produce a metaborate as a product;
   c) spraying the metaborate onto the cellulose insulation material;
   d) spraying an acid onto the cellulose insulation material to neutralize the basic property of the metaborate;
   e) drying the cellulose insulation material thereby producing a fire retarding insulation.

2. The method of claim 1 wherein the cellulose insulation material is derived from paper sheet.

3. The method of claim 1 wherein the alkali hydroxide is sodium or potassium hydroxide.

4. The method of claim 1 wherein the metaborate is Na2O.B2O3.4H2O or K2O.B2O3.4H2O.

5. The method of claim 1 wherein the spraying process is completed with a droplet size of between 40 to 100 microns.

6. The method of claim 1 wherein the spraying process deposits a maximum of 9% by weight of the metaborate onto the insulation material.

7. The method of claim 1 wherein the acid is H2SO4 or FeSO4.

8. The method of claim 1 wherein step (d) results in a pH in the insulation material of between 6.5 and 8.0.

* * * * *

UNITED STATES PATENT AND TRADEMARK OFFICE
CERTIFICATE OF CORRECTION

PATENT NO. : 6,025,027
DATED : February 15, 2000
INVENTOR(S) : Thomas Clifford Shutt It is certified that error appears in the above-identified patent and that said Letters Patent is hereby corrected as shown below:

<u>Title page,</u>
Item [73], Assignee: replace "Mountain Develoopment, Auburn, Calif." with
-- Mountain Develpment Inc., Auburn, Calif. --.

Signed and Sealed this

Twenty-sixth Day of February, 2002

Attest:

JAMES E. ROGAN
Attesting Officer     Director of the United States Patent and Trademark Office

UNITED STATES PATENT AND TRADEMARK OFFICE
CERTIFICATE OF CORRECTION

PATENT NO. : 6,025,027
DATED : February 15, 2000
INVENTOR(S) : Thomas Clifford Shutt It is certified that error appears in the above-identified patent and that said Letters Patent is hereby corrected as shown below:

<u>Title page,</u>
Item [73], Assignee: replace "Mountain Develpoment, Auburn, Calif." with
-- Mountain Development Inc., Auburn, Calif. --.

This certicate supersedes Certificate of Correction issued February 26, 2002.

Signed and Sealed this

Thirtieth Day of April, 2002

*Attest:*

JAMES E. ROGAN
*Attesting Officer*     *Director of the United States Patent and Trademark Office*